United States Patent
Kuo

(10) Patent No.: US 7,069,804 B2
(45) Date of Patent: Jul. 4, 2006

(54) GEAR LINKAGE DEVICE WITH REAL TIME CHECK

(75) Inventor: Tsung-Jung Kuo, Taipei (TW)

(73) Assignee: Lite-On It Corporation, Taipei (TW)

( * ) Notice: Subject to any disclaimer, the term of this patent is extended or adjusted under 35 U.S.C. 154(b) by 318 days.

(21) Appl. No.: 10/430,768

(22) Filed: May 5, 2003

(65) Prior Publication Data

US 2004/0074328 A1    Apr. 22, 2004

(30) Foreign Application Priority Data

Oct. 18, 2002    (TW) ............................ 91216714 A

(51) Int. Cl.
| F16H 55/17 | (2006.01) |
| G11B 17/03 | (2006.01) |
| G11B 17/028 | (2006.01) |
| G11B 19/20 | (2006.01) |

(52) U.S. Cl. ........................................ 74/437; 720/706
(58) Field of Classification Search ................ 74/437; 720/600, 619, 620, 623, 616, 706
See application file for complete search history.

(56) References Cited

U.S. PATENT DOCUMENTS

| 466,923 | A | * | 1/1892 | Price ............................ 74/437 |
| 3,122,946 | A | * | 3/1964 | Hedges ......................... 475/17 |
| 3,216,273 | A | * | 11/1965 | Colmer, Jr. ................... 74/457 |
| 3,878,777 | A | * | 4/1975 | Clary .......................... 101/93.28 |
| 4,022,075 | A | * | 5/1977 | Schuder et al. ................ 74/437 |
| 4,093,180 | A | * | 6/1978 | Strabala ....................... 251/248 |
| 4,602,527 | A | * | 7/1986 | Tamiya ........................ 475/230 |
| 4,911,268 | A | * | 3/1990 | Kulpa .......................... 185/37 |
| 5,018,401 | A | * | 5/1991 | Ida et al. ...................... 74/354 |
| 5,209,134 | A | * | 5/1993 | Nguyen et al. ................ 74/437 |
| 5,349,488 | A | * | 9/1994 | Shibata et al. ............. 360/251.2 |
| 5,619,388 | A | * | 4/1997 | Kawai .......................... 360/85 |
| 6,021,683 | A | * | 2/2000 | Doege et al. .................. 74/44 |
| 6,137,962 | A | * | 10/2000 | Namai ......................... 396/401 |
| 6,182,550 | B1 | * | 2/2001 | Brewington et al. .......... 83/603 |
| 6,301,981 | B1 | * | 10/2001 | Oechslin ....................... 74/1.5 |
| 6,457,452 | B1 | * | 10/2002 | Sakita .......................... 123/245 |
| 2005/0193399 | A1 | * | 9/2005 | Lin et al. ..................... 720/619 |

* cited by examiner

*Primary Examiner*—Richard Ridley
*Assistant Examiner*—James Pilkington
(74) *Attorney, Agent, or Firm*—Thomas, Kayden, Horstemeyer & Risley

(57) ABSTRACT

A gear linkage device with real time check. The gear linkage device with real time check includes a first gear link and a second gear link. The first gear link includes a flange provided with a notch and a plurality of first toothed portions on the lateral surface thereof. The second gear link includes a finger corresponding to the notch and a plurality of second toothed portions on the lateral surface thereof, corresponding to the first toothed portions. When the first gear link engages with the second gear link, the finger engages with the notch so as to avoid the misalignment between the first gear link and the second gear link, problems associated therewith.

9 Claims, 3 Drawing Sheets

GEAR LINKAGE DEVICE WITH REAL TIME CHECK

BACKGROUND OF THE INVENTION

1. Field of the Invention

The present invention is related to a gear linkage device with real time check, and particularly to a gear linkage device having precise positioning to avoid assembly defects and thus reduce defective fraction when assembling.

2. Description of the Related Art

Two conventional gears provided with linking components engage with each other. When one gear is rotated to one position, the other gear is rotated to a corresponding predetermined position. When assembling, is the two gears must engage with each other in a specific position. However, each of the two gears has so many teeth that it is difficult for them to engage with each other in the specific position, and thus a misalignment occurs. A product with misalignment is not suitable for use and needs to be disassembled and then reassembled. This wastes assembly time and adds to the manufacturing cost.

Therefore, a need exists for a gear linkage device capable of avoiding the misalignment described, to make assembly more efficient and avoid increased manufacturing costs therefrom.

SUMMARY OF THE INVENTION

One object of the invention is to provide a gear linkage device with real time check which has precise positioning and avoids errors in assembly.

Another object of the invention is to provide a gear linkage device with real time check, wherein as a first gear link and a second gear link rotate, if a notch of the first gear link and a finger of the second gear link rotate to a specific position but cannot engage with each other, the misalignment is recognized and a modification can be performed immediately.

Another object of the invention is to provide a gear linkage device with real time check which avoids the misalignment of the engaged gears.

Another object of the invention is to provide a gear linkage device with real time check which reduces the assembly time and thus reduces manufacturing costs.

According to the objects of the invention mentioned above, the gear linkage device with real time check in the invention comprises a first gear link and a second gear link. The first gear link includes a plurality of first toothed portions on the lateral surface and a flange on the end surface thereof. A notch is formed on the flange. The second gear link includes a plurality of second toothed portions on the lateral surface thereof corresponding to the first toothed portions and a finger on the end surface corresponding to the notch. Therefore, when the first gear link engages with the second gear link, the notch engages with the finger. This saves the assembly time and avoids misalignment which may occur at the engagement between the first gear link and the second gear link thereby reducing the assembly error and manufacturing costs.

The present invention may best be understood through the following description with reference to the accompanying drawings. However, the drawings are provided for description of the invention but not to limit the scope of the invention.

DETAILED DESCRIPTION OF THE INVENTION

Figure 1:
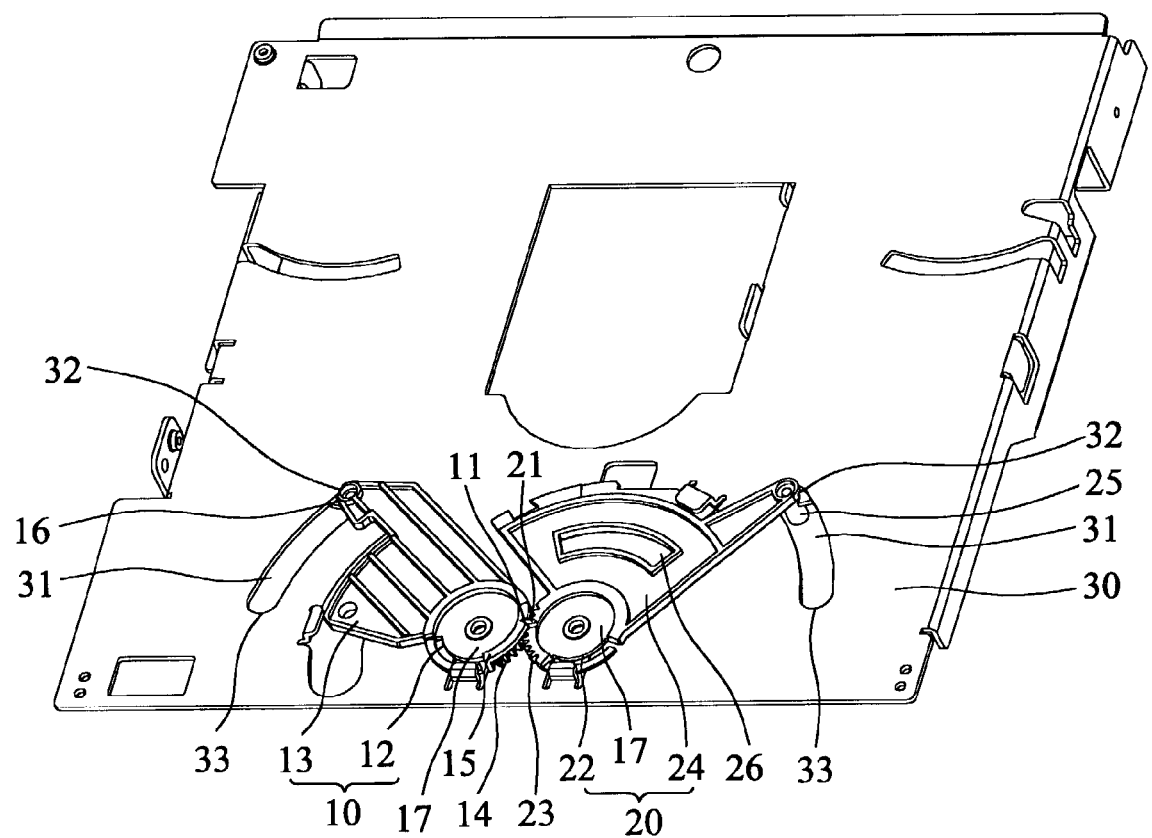
FIG. 1 is a perspective view of a gear linkage device with real time check secured on a board according to the invention.
Figure 2:
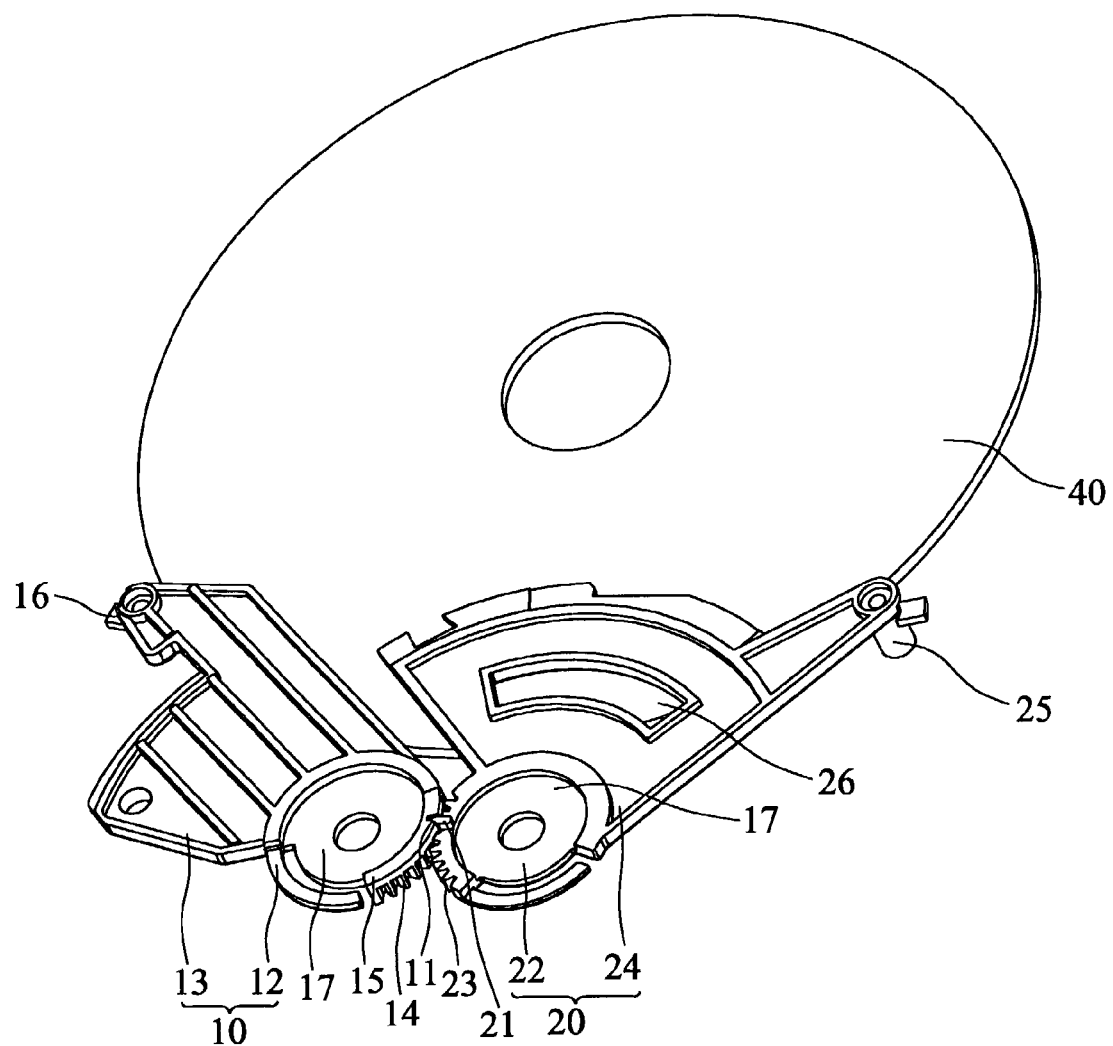
FIG. 2 is a perspective view of a gear linkage device with real time check holding a disc according to the invention.

Referring to FIG. 1 and FIG. 2, the gear linkage device in the invention comprises a first gear link 10 and a second gear link 20. The gear links 10, 20 are pivoted on a board 30. A notch 11 is formed on the first gear link 10 and a finger 21 corresponding to the notch 11 is formed on the second gear link 20 so that the first gear link 10 engages with the second gear link 20 at a corresponding position when they rotate with engagement. It also contributes to the engagement between the notch 11 and the finger 21 when assembling the gear links 10, 20 so as to avoid the misalignment of the gear links 10, 20 when rotating with engagement. Therefore, the first gear link 10 and the second gear link 20 are rotated to a corresponding predetermined position against the rim of a disc 40 so as to hold the disc 40.

Referring to FIG. 2, the first gear link 10 includes a first gear 12 and a link 13 extending from the first gear 12. The first gear 12 is provided with a plurality of first toothed portions 14 on the lateral surface thereof and a flange 15 on the upper end surface thereof. The flange 15 can be an annular flange with a notch 11 formed thereon. A first stopper 16 is positioned on a bottom surface of the link 13 and extends from the bottom surface of the link 13. The second gear link 20 includes a second gear 22 and a second link 24 extending from the second gear 22. The second gear 22 is provided with a finger 21 on the upper end surface thereof, corresponding to the notch 11 and a plurality of second toothed portions 23 on the lateral surface thereof, corresponding to the first toothed portions 14. A second stopper 25 is positioned on a surface of the link 24 and extends from the bottom surface of the link 24. Depressions 17 are formed respectively on the upper end surfaces of the first gear 12 and the second gear 22 and a slide groove 26 is formed on the second link 24.

Figure 3:
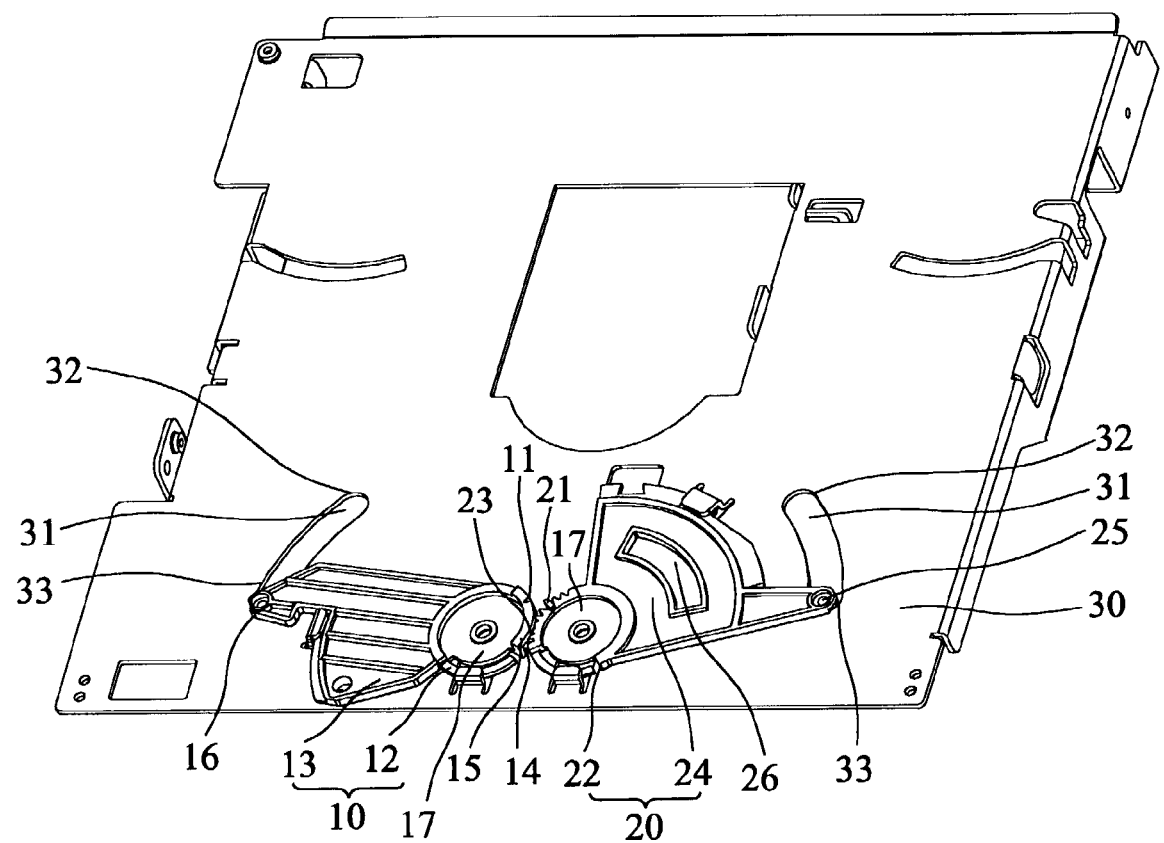
FIG. 3 is another perspective view of a gear linkage device with real time check secured on a board according to the invention.

Referring to FIG. 1 and FIG. 3, two arc slots 31 are formed on the board 30. The first gear link 10 and the second gear link 20 are pivotally connected to the board 30. The first stopper 16 of the first link 13 and the second stopper 25 of the second link 24 are respectively adapted to travel within and extend through the two arc slots 31 and can slide therein. When the first gear link 10 and the second gear link 20 rotate with the engagement between the toothed portions 14 and 23, the notch 11 of the first gear 12 may engage with the finger 21 of the second gear 22 so that the first stopper 16 of the first link 13 and the second stopper 25 of the second link 24 may reach the upper dead points 32 or the lower dead points 33 of the arc slots 31 simultaneously. However, as the first gear link 10 and the second gear link 20 rotate with engagement, if the notch 11 of the first gear link 10 cannot engage with the finger 21 of the second gear link 20 and rotation is stopped due to the finger 21 of the second gear link 20 jamming against the flange 15 of the first gear link 10. The first stopper 16 and the second stopper 25 thus cannot reach the upper dead points 32 or the lower dead points 33 of the arc slots 31 simultaneously, and it is indicated that the first gear link 10 is engaged with the second gear link 20 in a wrong position, and a misalignment occurs.

Therefore, the notch 11 of the flange 15 and the finger 21 are designed as a function for real time check. When assembling the first gear link 10 and the second gear link 20, by engaging the notch 11 of the first gear 12 with the finger 21 of the second gear 22 in advance, the first gear link 10 engages with the second gear link 20 in a correct position. When the first gear link 10 and the second gear link 20 rotate with engagement, the notch 11 of the first gear link 10 cannot engage with the finger 21 of the second gear link 20 and the rotation is stopped due to the finger 21 jamming against the flange 15. Therefore, a misalignment occurs between the first gear link 10 and the second gear link 20 and a modification can be made immediately.

Gears 12, 22 may be spur gears, helical gears or bevel gears (not shown in the figures). By the design of functions for real time check, the misalignment can be avoided and the design can be applied to devices with elements having toothed portions engaged in specific corresponding positions. Therefore, such devices can be applied to CD-ROMs, Audio equipments and Video/Audio players etc. to locate discs.

As a summary, the gear linkage device with real time check in the invention utilizes the engagement between the notch on the flange of the first gear link and the finger of the second gear link to enable the precise positioning therebetween saving the assembly time and thus avoiding the added manufacturing costs due to assembly error.

While the present invention has been described with reference to the preferred embodiments thereof, it is to be understood that the invention is not limited to the described embodiments or constructions. On the contrary, the invention is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A gear linkage device with real time cheek comprising:
   a first gear link comprising a plurality of first toothed portions said toothed portions lying in a first plane on a first lateral surface thereof, and a flange with a notch lying in a second plain said flange on a first upper end surface thereof; and
   a second gear link comprising a plurality of second toothed portions on a second lateral surface thereof corresponding to the first toothed portions, and a finger on a second upper end surface of the second gear link corresponding to the notch.

2. The gear linkage device with real time check as claimed in claim 1, wherein the second gear link has a slide groove.

3. The gear linkage device with real time check as claimed in claim 1, wherein both of the first and the second gear links have a depression respectively on the first and the second upper end surfaces thereof.

4. A gear linkage device with real time check comprising:
   a first gear link including a first gear with a first link extending from the first gear, the first gear having a plurality of first toothed portions formed on a first lateral surface thereof, and a flange with a notch formed on a first upper end surface thereof; and
   a second gear link including a second gear with a second link extending from the second gear, the second gear having a plurality of second toothed portions on a second lateral surface thereof corresponding to the first toothed portions, and a finger on a second upper end surface thereof corresponding to the notch.

5. The gear linkage device with real time check as claimed in claim 4, wherein the said gears are spur gears.

6. The gear linkage device with real time check as claimed in claim 4, wherein the said gears are helical gears.

7. The gear linkage device with real time check as claimed in claim 4, wherein both of the first and the second gear links include a stopper extending outward.

8. The gear linkage device with real time check as claimed in claim 4, wherein the second gear link includes a slide groove.

9. A gear linkage device with real time check as claimed in claim 4, wherein both the first and the second gears have a depression respectively on the first and the second upper end surfaces thereof.

* * * * *